United States Patent
Junghahnel et al.

[15] 3,681,496

[45] Aug. 1, 1972

[54] BACTERIOSTAT AND FUNGISTAT COMPOSITIONS CONTAINING N,S-HETEROCYCLIC COMPOUNDS

[72] Inventors: Rudolph Junghahnel, Witten-Bommern; Gustav Renckhoff, Witten-Ruhr; Klaus Thewalt, Witten-Ruhr, all of Germany

[73] Assignee: Dynamit Nobel Aktiengesellschaft, Troisdorf, Germany

[22] Filed: July 16, 1968

[21] Appl. No.: 745,087

[30] Foreign Application Priority Data

July 20, 1962 Germany......................D 53635

[52] U.S. Cl....................................424/246, 424/270
[51] Int. Cl. ................................A01n 9/12
[58] Field of Search................................424/246, 270

[56] References Cited

UNITED STATES PATENTS 3,471,618 10/1969 Beereboom...................424/246

OTHER PUBLICATIONS

Wenker, J. Am. Chem. Soc., Vol. 57, p. 1029– 80 (1935)

Sheehan et al., J. Am. Chem. Soc., Vol. 23, p. 4367– 72 (1951)

Iwakura et al., J. Org. Chem., Vol. 31, p. 3352– 56 (1966)

*Primary Examiner*—Albert T. Meyers
*Assistant Examiner*—Vincent D. Turner
*Attorney*—Craig, Antonelli & Hill

[57] ABSTRACT

The use of $\Delta^2$-thiazolines and 4,5-dihydro-1,3-thiazines as bacteriostats and fungistats. Used alone or with a carrier, they are effective in inhibiting the growth of bacteria and fungi. The N,S-heterocyclics are especially effective against gram-positive bacteria.

7 Claims, No Drawings

BACTERIOSTAT AND FUNGISTAT COMPOSITIONS CONTAINING N,S-HETEROCYCLIC COMPOUNDS

BACKGROUND OF THE INVENTION

The present invention relates to the utilization of novel cyclic N-S compounds as bacteriostats and fungistats. More particularly, it relates to $\Delta^2$-thiazolines and 4,5-dihydro-1,3-thiazines and to their use in inhibiting the growth of bacteria and fungi.

N-S-heterocyclic compounds have been examined in a plurality of cases with respect to their bacteriostatic and fungistatic properties. However, in this regard, there is no prior art teaching the use of $\Delta^2$-thiazolines and 1,3-thiazines.

SUMMARY OF THE INVENTION

One of the objects of the present invention is to provide novel bacteriostat and fungistat compositions.

Another object of the present invention is to provide a process for effectively inhibiting the growth of bacteria and fungi in a relatively simple and direct manner.

A further object of the invention is to effectively use the desirable bacteriostat and fungistat properties possessed by $\Delta^2$-thiazolines and 1,3-thiazines.

These and other objects and advantages of the present invention will become apparent to those skilled in the art from a consideration of the following specification and claims.

In accordance with the present invention, it has been found that $\Delta^2$-thiazolines and 4,5-dihydro-1,3-thiazines having the general formula:

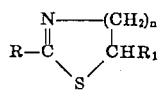

wherein R is a branched- or straight-chain aliphatic group of five to 12 carbon atoms, in particular $C_5 - C_{12}$ alkyl, $R_1$ is methyl or hydrogen and $n$ is 1 or 2, exhibit a good bacteriostatic and fungistatic effect with respect to gram-positive and gram-negative bacteria, as well as against various genera of fungi.

The compounds with h=2, utilized in the present invention can be prepared, for example, in accordance with the disclosure in copending application Ser. No. 728,075 filed on May 9, 1968 (now U.S. Pat. No. 3,528,973) the disclosure of which is herein expressly incorporated by reference. Briefly, these 1,3-N-S-heterocyclic compounds are prepared by reacting hydroxyalkyl amides of the general formula, $RCONH-CH_2-(CH_2)_n-CH_2OH$, with phosphorus pentasulfide.

The tests showing the effectiveness of the compounds utilized in the present invention were conducted in accordance with the following methods:

1. The detection of bacteriostatic and fungistatic effects was effectuated with the aid of the dilution test along the lines of the regulations promulgated by the "Deutsche Gesellschaft fur Hygiene and Mikrobiologie" (German Society for Hygiene and Microbiology), for the testing of chemical disinfectants.

2. The growth test was conducted in accordance with DIN Preliminary Standard 53,931.

The effectiveness of the N-S-heterocyclics against gram positive bacteria (*Staphylococcus Aureus*)is stronger than that against gram-negative ones (*Bacterium coli*). The effective concentration against gram-positive bacteria is below 0.012 percent by weight in the case of:

2-heptyl-dihydro-6H-1,3-thiazine
2-octyl-dihydro-6H-1,3-thiazine
2-hexyl-dihydro-6H-1,3-thiazine
2-($C_6 - C_{12}$)-4,5-dihydro-6H-1,3-thiazine, and below 0.06 percent by weight in the case of:

2-heptyl-thiazoline-2
2-nonyl-thiazoline-2.

Against gram-negative bacteria, the inhibitory effect is below 0.06 percent in the case of the following compounds:

2-heptyl-dihydro-6H-1,3-thiazine
2--octyl-dihydro-6H-1,3-thiazine.

Against molds (*Aspergillus niger*), inhibitory concentrations of below 0.06 percent are found in the case of the following compounds:

2-nonyl-dihydro-6H-1,3-thiazine
2-octyl-dihydro-6H-1,3-thiazine.

A 4 percent coating of the following compounds on nettle fabric proved to be an effective growth inhibitor against mold fungus (Aspergillus niger):

2-nonyl-dihydro-6H-1,3-thiazine
2-undecanoyl-4,5-dihydro-6H-1,3-thiazine
2-($C_6 - C_{12}$)-4,5-dihydro-6H-1,3-thiazine.

It is to be understood that the above specific examples are given merely as illustrative of the present invention and are not to be considered as limiting. Unless otherwise noted, the percentages are by weight.

It is also to be understood that not all of the compounds utilized in the process of the present invention are effective to the same degree. However, one skilled in the art should be able to ascertain an effective concentration which would be warranted in any given situation.

The compounds employed in the invention may be used either per se or as a composition together with a suitable inert carrier. A typical inert carrier which may be utilized is, for example, an inert hydrocarbon solvent, such as toluene or xylene.

The invention being thus described, it will be obvious that the same may be varied in many ways. Such variations are not to be regarded as a departure from the spirit and scope of the invention, and all such modifications are intended to be included within the scope of the following claims.

We claim:

1. A process for inhibiting the growth of microorganisms selected from the group consisting of bacteria and fungi which comprises applying to said microorganisms a growth-inhibiting amount of a cyclic N,S-heterocyclic compound having the formula:

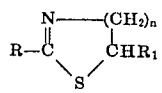

wherein R is a branched- or straight-chain aliphatic group of five to 12 carbon atoms, $R_1$ is methyl or hydrogen and $n$ is 1 or 2.

2. The process of claim 1, wherein said microorganisms are gram-positive bacteria and said compound is selected from the group consisting of 2-heptyl-dihydro-6H-1,3-thiazine, 2-octyl-dihydro-6H-1,3-thiazine, 2-hexyl-dihydro-6H-1,3-thiazine, 2-($C_6$—$C_{12}$)-4,5-dihydro-6H-1,3-thiazine, 2-heptyl-thiazoline-2 and 2-nonyl-thiazoline-2.

3. The process of claim 1, wherein said microorganisms are gram-negative bacteria and said compound is selected from the group consisting of 2-heptyl-dihydro-6H-1,3-thiazine, and 2-octyl-dihydro-6H-1,3-thiazine.

4. The process of claim 1, wherein said microorganisms are molds and said compound is selected from the group consisting of 2-nonyl-dihydro-6H-1,3-thiazine, 2-octyl-dihydro-6H-1,3-thiazine, 2-undecanoyl-4,5-dihydro-6H-1,3-thiazine and 2-($C_6$ — $C_{12}$)-4,5-dihydro-6H-1,3-thiazine.

5. A process for inhibiting the growth of bacteria and fungi which comprises treating a nettle fabric with a growth-inhibiting amount of an N,S-heterocyclic compound having the formula:

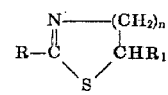

wherein R is a branched- or straight-chain aliphatic group of five to 12 carbon atoms, $R_1$ is methyl or hydrogen and $n$ is 1 or 2.

6. A bacteriostat and fungistat composition comprising an effective bacteriostatic or fungistatic amount of a cyclic N,S-heterocyclic compound having the formula:

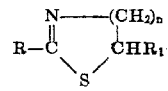

wherein R is a branched- or straight-chain aliphatic group of five to 12 carbon atoms, $R_1$ is methyl or hydrogen and $n$ is 1 or 2, and an inert hydrocarbon solvent.

7. The composition of claim 6, wherein said inert carrier is toluene or xylene.

* * * * *